(12) United States Patent
Blechingberg et al.

(10) Patent No.: US 11,679,365 B2
(45) Date of Patent: Jun. 20, 2023

(54) ROTARY MACHINE WITH ADJUSTABLE LEAKAGE GAP

(71) Applicant: Sulzer Management AG, Winterthur (CH)

(72) Inventors: Erik Blechingberg, Gothenburg (SE); Amir Baniameri, Gothenburg (SE); Mikael Andersson, Gothenburg (SE)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 16/856,151

(22) Filed: Apr. 23, 2020

(65) Prior Publication Data

US 2020/0368704 A1    Nov. 26, 2020

(30) Foreign Application Priority Data

May 22, 2019 (EP) .................................... 19175939

(51) Int. Cl.
*B01F 29/00* (2022.01)
*B01F 25/00* (2022.01)
*B01F 35/30* (2022.01)

(52) U.S. Cl.
CPC ......... *B01F 29/40* (2022.01); *B01F 2025/911* (2022.01); *B01F 2025/932* (2022.01); *B01F 2035/352* (2022.01); *B01F 2035/3512* (2022.01)

(58) Field of Classification Search
CPC ............ B01F 9/0032; B01F 2005/0005; B01F 2005/0094; B01F 2015/00097;
(Continued)

(56) References Cited

U.S. PATENT DOCUMENTS 3,887,169 A * 6/1975 Maynard ................... B01F 7/06
366/307
4,384,788 A * 5/1983 Lenart ............... B01F 15/00688
366/314

(Continued)

FOREIGN PATENT DOCUMENTS

EP    2327910 A1    6/2011

OTHER PUBLICATIONS

Extended European Search Report dated Dec. 2, 2019 in corresponding European Patent Application No. 19175939.8, filed May 22, 2019.

*Primary Examiner* — Charles Cooley
(74) *Attorney, Agent, or Firm* — Global IP Counselors, LLP

(57) ABSTRACT

A rotary machine for acting on a process fluid includes an impeller, a shaft, a drive, a seal and a flush casing. The impeller acts on the process fluid and is mounted on the shaft. The drive is connected to the shaft and rotates the shaft and the impeller about an axial direction. The seal has a sealing element sealing the shaft during rotation of the shaft. The flush casing receives a flushing fluid for flushing the sealing element, and delimits an annular flush chamber extending about the sealing element. The flush casing includes a bushing surrounding the sealing element and delimits a radial leakage gap arranged between the sealing element and the bushing. The bushing delimits an axial leakage gap between the impeller and the bushing, and the width of the axial leakage gap in the axial direction is adjustable.

17 Claims, 5 Drawing Sheets

(58) Field of Classification Search
CPC ........ B01F 2015/0011; B01F 15/00006; B01F 7/00233; B01F 7/00016; B01F 7/02; B01F 15/00025; B01F 29/40; B01F 2025/911; B01F 2025/932; B01F 2035/3512; B01F 2035/352; B01F 2035/3513; B01F 33/86; B01F 27/051; B01F 27/11; B01F 27/60; B01F 35/1452; F16J 15/3448; F16J 15/3404; F16J 15/342; F16J 15/346
USPC .......................................... 366/331, 285–286
See application file for complete search history.

(56) References Cited

U.S. PATENT DOCUMENTS

| | | | |
|---|---|---|---|
| 4,511,255 A * | 4/1985 | Saucier | B01F 7/00725 366/138 |
| 4,669,735 A | 6/1987 | Sundberg et al. | |
| 4,878,677 A * | 11/1989 | Larkins | F16J 15/008 277/511 |
| 5,658,127 A | 8/1997 | Bond et al. | |
| 5,735,603 A * | 4/1998 | Kesig | B01F 7/02 366/331 |
| 6,193,409 B1 * | 2/2001 | Brunson | B01F 15/00675 277/370 |
| 6,572,261 B1 * | 6/2003 | Angerhofer | B01F 7/06 366/331 |
| 11,421,787 B2 * | 8/2022 | McCoy | F16J 15/4472 |
| 2005/0285348 A1 | 12/2005 | Prinz | |
| 2011/0254231 A1 * | 10/2011 | Isenberg | F16J 15/002 277/500 |
| 2020/0368704 A1 * | 11/2020 | Blechingberg | B01F 9/0032 |
| 2021/0299623 A1 * | 9/2021 | Ottelin | B01F 33/86 |

* cited by examiner

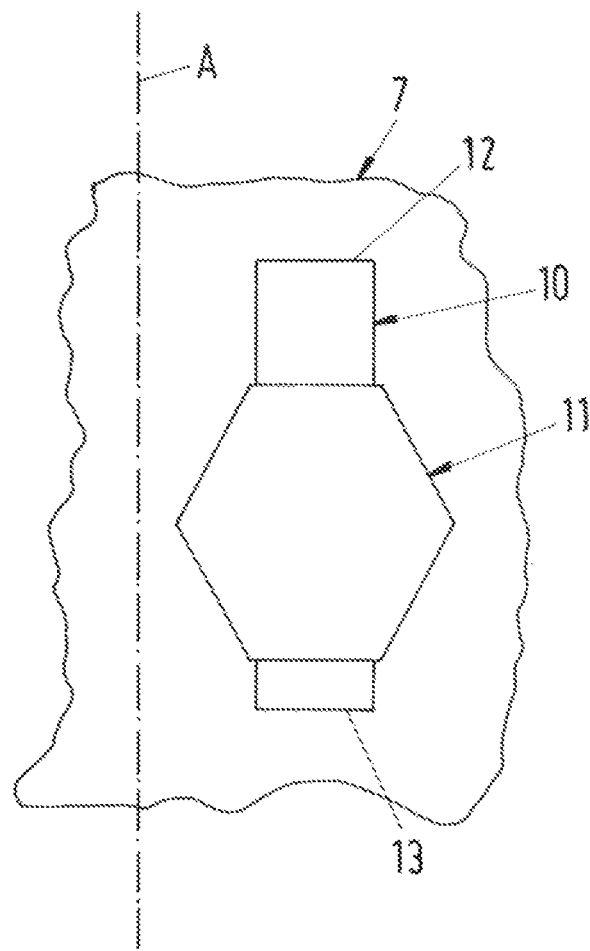

ROTARY MACHINE WITH ADJUSTABLE LEAKAGE GAP

CROSS-REFERENCE TO RELATED APPLICATION

This application claims priority to European Patent Application No. 19175939.8, filed May 22, 2019, the content of which is hereby incorporated herein by reference.

BACKGROUND

Field of the Invention

The invention relates to a rotary machine for acting on a process fluid.

Background Information

Conventional rotary machines for mixing, pumping, agitating or otherwise acting on one process fluid or several process fluids such as agitators are generally used in many different industrial processes for mixing or agitating e.g. a liquid or a liquid containing solids.

In many applications the process fluid is contained in a tank or a tower or another vessel and the agitator is mounted to a wall or the bottom or the cover of the vessel. Amongst the wide range of industries where agitators are used is for example the pulp and paper industry. Here, agitators are used for example for dilution, mixing or bleaching processes. As an example, the process fluid may be pulp which is a suspension comprising fibrous materials and water.

Basically a rotary machine like an agitator comprises an impeller or propeller for acting on the fluid, a shaft which is connected at one end to the impeller and at the other end to a drive unit for rotating the shaft with the impeller. The drive unit usually has a motor and a coupling for connecting the motor with the shaft, wherein the coupling comprises a belt drive or a gear box or any other suited transmission device.

Typically the drive unit is arranged outside of the vessel and at least a part of the shaft with the impeller is located inside the vessel for agitating the process fluid. There are known both top-mounted and side-mounted agitators. Top-mounted agitators are usually mounted to the cover or the top part of the tower or the vessel with the shaft of the agitator extending vertically. Side-mounted agitators are usually mounted to a side wall of the tower or the vessel with the shaft extending horizontally. Examples for both types of agitators are those which are sold by the applicant under the brands AGISTAR™, SALOMIX™ and SCABA™.

The agitator comprises a sealing unit for sealing the shaft, such that the process fluid cannot escape from the vessel along the shaft. The sealing unit may be configured with a mechanical seal or a gland packing or any other sealing element. For many applications it is known to provide the agitator with a flush device for flushing the sealing element. The flush device is arranged around the sealing element in close proximity to the impeller and delimits a annular flush chamber. The flush device may comprise a bushing that surrounds the shaft. The bushing usually delimits two leakage gaps through which a flushing fluid may escape from the flush chamber, namely a radial leakage gap between the sealing element and the bushing and an axial leakage gap between the bushing and the impeller, e.g. the hub of the impeller.

Usually both the radial leakage gap and the axial leakage gap are arranged between a rotating component and a stationary component during operation of the rotary machine. The axial leakage gap is arranged between the stationary bushing and the rotating impeller, and the radial leakage gap is arranged between the stationary bushing and e.g. the rotating part of a mechanical seal.

During operation of the agitator a flushing fluid, for example water, is introduced into the flush chamber, passes through the radial leakage gap, then through the axial leakage gap and is discharged, usually into the vessel. Flushing the sealing element has the primary function to prevent the process fluid e.g. a suspension, from entering the sealing unit. The flow of flushing fluid directed through the radial and the axial leakage gap constitutes a barrier for the process fluid, so that the sealing unit is protected against the intrusion of the process fluid. In particular solid components in the process fluid such as fibrous material could cause enhanced or excessive wear in the sealing unit or other components.

Another important function of flushing the sealing unit, in particular when the process fluid is hot, is the cooling of the sealing unit by the flushing fluid.

SUMMARY

In view of a reliable and efficient functioning of the flushing of the sealing element it is desirable that the flushing fluid has a high velocity in the leakage gaps. Therefore, the width of the leakage gaps should be quite small. For example, a typical value for the width of the radial leakage gap is about 0.3 mm. On the other hand, when the width of the leakage gaps is too small, an excessive wear may result or even worse, the flushing does not work properly. For example, when the axial leakage gap is not properly dimensioned, the fluid film between the bushing and the impeller may tear off resulting in a physical contact between the bushing and the impeller, even a metal, metal contact may occur. This causes excessive wear or even considerable damages.

Starting from this state of the art it is an object of the invention to propose an improved rotary machine, in particular an agitator, which enables a reliable, low-wear and efficient flushing of the sealing element.

The subject matter of the invention satisfying this object is characterized by the features described herein.

Thus, according to an aspect of the invention, a rotary machine for acting on a process fluid is provided, comprising an impeller for acting on the process fluid, a shaft, on which the impeller is mounted, a drive unit operatively connected to the shaft for rotating the shaft and the impeller about an axial direction, a sealing unit having a sealing element for sealing the shaft during rotation of the shaft, and a flush casing configured to receive a flushing fluid for flushing the sealing element, wherein the flush casing is configured to delimit an annular flush chamber extending about the sealing element, wherein the flush casing comprises a bushing surrounding the sealing element and delimiting a radial leakage gap arranged between the sealing element and the bushing, and wherein the bushing is arranged and configured to delimit an axial leakage gap between the impeller and the bushing, wherein the width of the axial leakage gap in the axial direction is adjustable.

Since the width of the axial leakage gap, i.e. the extension of the axial leakage gap in the axial direction is adjustable it can be perfectly fitted to the respective application. It is no longer necessary to fix the width of the axial leakage gap already during the production of the rotary machine, but it is possible to adjust the width of the axial leakage gap even after the mounting of the rotary machine, e.g. after the rotary machine has been mounted to a wall of a vessel. Thus, the distance in axial direction between the bushing of the flush casing and the impeller, in particular the hub of the impeller, may be adjusted and optimized after the rotary machine has been mounted to the location where it shall operate.

Thus, by the rotary machine according to one aspect of the invention it is possible to control or to set the velocity of the flushing fluid in the axial leakage gap. It is no longer necessary to manufacture the rotary machine with a safety clearance regarding the axial leakage gap, because after installation of the rotary machine the width of the axial leakage gap may be adjusted to an optimal value. For example, the width of the axial leakage gap may be set to zero or at least approximately zero, so that the velocity of the flushing fluid in the axial leakage gap becomes very high. A nominal width of zero of the axial leakage gap means that the bushing is just touching the impeller, e.g. the impeller hub, during standstill of the rotary machine. During operation of the rotary machine the flushing fluid may leak through the axial leakage gap of nominal zero width with a very high velocity. A high velocity of the flushing fluid in the axial leakage gap ensures, that the process fluid and in particular solid constituents of the process fluid may not enter the sealing unit. Therewith the reliability of the rotary machine is enhanced and the wear is reduced.

The possibility to adjust the width of the axial leakage gap after the mounting of the rotary machine makes the manufacturing of the rotary machine easier and cheaper because the manufacturing can be done with wider tolerances.

It is an additional advantage of the adjustable width of the axial leakage gap that the consumption of the flushing fluid may be minimized which makes the operation of the rotary machine more efficient and less expensive.

Furthermore, it is also possible to re-adjust the width of the axial leakage gap, e.g. after some time of operation of the rotary machine. If the width of the axial leakage gap changes, for example the width becomes larger due to wear, the width of the axial gap may be easily changed to the desired value. This reduces the service and maintenance efforts.

According to a preferred embodiment, the flush casing is configured to be movable in the axial direction.

Preferably the flush casing is configured to be movable in the axial direction between a first end position and a second end position. Thus, there is a maximum width of the axial leakage gap, for example when the flush casing is in the first end position.

According to one embodiment, the width of the axial leakage gap is zero, when the flush casing is in an operating position located between the first end position and the second end position, so that the bushing abuts against the impeller. Thus, preferably the flush casing is neither in the first end position nor in the second end position when it is in the operating position, where the width of the axial gap is zero, so that the bushing touches the impeller. This measure has the advantage that the width of the axial leakage gap can be re-adjust after some operating time, e.g. if the width of the axial leakage gap increases.

The width of the axial leakage gap has a maximum value when the flush casing is in one of the first and the second end position. Usually the width of the axial leakage gap has its maximum value during mounting of the rotary machine e.g. to a wall of a vessel. When the mounting is finished the flush casing is moved to the operating position.

The maximum value is not a critical value. It may be adapted to the respective application or location. Just as examples the maximum value may be at most 5 mm, or at most 1 mm, or at most 0.5 mm.

According to one embodiment the flush casing comprises a plurality of slot holes with each slot hole extending in the axial direction, and wherein for each slot hole a fixing element is configured to engage the respective slot hole and for fixing the flush casing with respect to the axial direction. This design is quite easy to manufacture and enables a reliable adjustment of the width of the axial leakage gap.

Preferably the bushing comprises an annular front side facing the impeller, wherein at least one radially extending groove is disposed in the front side of the bushing. The radially extending groove(s) has/have the advantage that even at a zero distance between the front side of the bushing and the impeller, e.g. the impeller hub, there is still at least one flow channel for the flushing fluid to escape from the flush chamber.

As an advantageous measure the front side of the bushing is made of a plastic.

In preferred embodiments, the bushing is made of a plastic. A suited plastic due to its wear properties is for example polytetrafluoroethylene (PTFE), which is commercially available under the trade name TEFLON.

According to a preferred design the rotary machine comprises a mounting flange for fastening the rotary machine to a wall of a vessel.

In a specifically preferred embodiment the rotary machine is designed as an agitator for mixing or agitating the process fluid.

Furthermore, it is preferred that the agitator is designed as a side-mounted agitator for being horizontally mounted to a wall of a vessel.

In other embodiments the agitator may be designed as a top-mounted agitator for being mounted vertically to a wall of a vessel for the process fluid. However, the agitator may also be designed for other types of mounting it to a vessel, a tower, a tank or the like.

Further advantageous measures and embodiments of the invention will become apparent from the dependent claims.

BRIEF DESCRIPTION OF THE DRAWINGS

The invention will be explained in more detail hereinafter with reference to the drawings.

FIG. 5 is a detail of the flush casing.

DETAILED DESCRIPTION OF THE EMBODIMENTS

In the following description of the invention reference is made by way of example to a rotary machine designed as an agitator for mixing or agitating a process fluid. Although this is in practice an important embodiment of a rotary machine according to the invention, it has to be understood that the invention is not restricted to such embodiments as an agitator. The rotary machine according to the invention may also be designed as any other type of a rotary machine for mixing, pumping, agitating or otherwise acting on process fluids. Preferably the rotary machine is intended for being mounted to a wall of a vessel.

Figure 1:
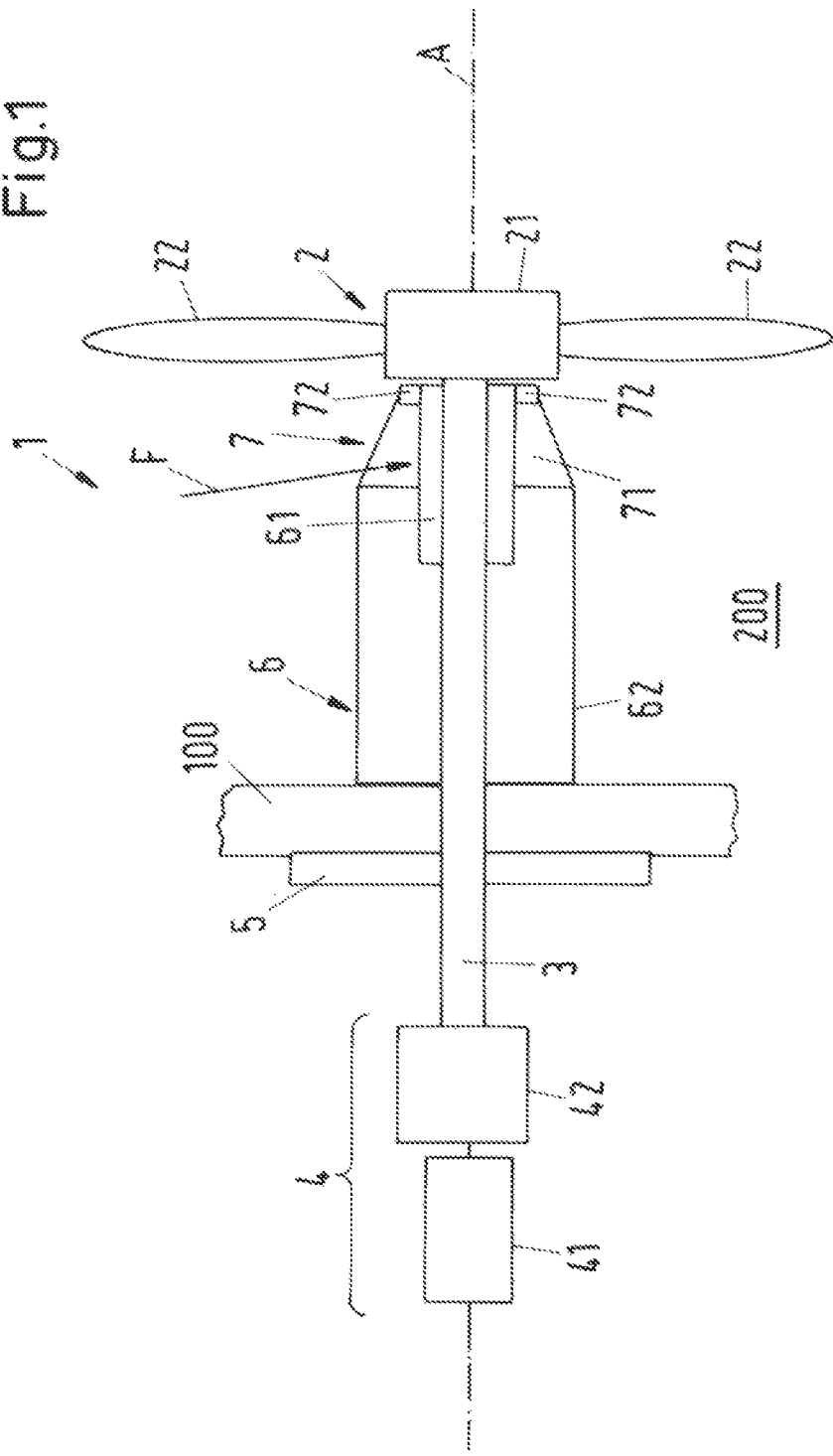
FIG. 1 is a schematic representation of an embodiment of a rotary machine according to the invention designed as an agitator.

For the sake of a better understanding, firstly the general setup of an agitator will be explained referring to FIG. 1. FIG. 1 shows a schematic representation of an embodiment of a rotary machine according to the invention and designed as an agitator for mixing or agitating a process fluid in a vessel or a tank or the like. The agitator is designated in its entity with reference numeral 1. FIG. 1 shows the agitator being horizontally mounted to a wall 100 of a vessel 200 containing the process fluid on which the agitator 1 is acting.

The agitator comprises an impeller 2 for acting on the process fluid in the vessel 200. The impeller comprises a hub 21 and a plurality of blades 22 mounted to the hub 21 for acting on the process fluid. For example, the impeller 2 has three blades 22.

Figure 2:
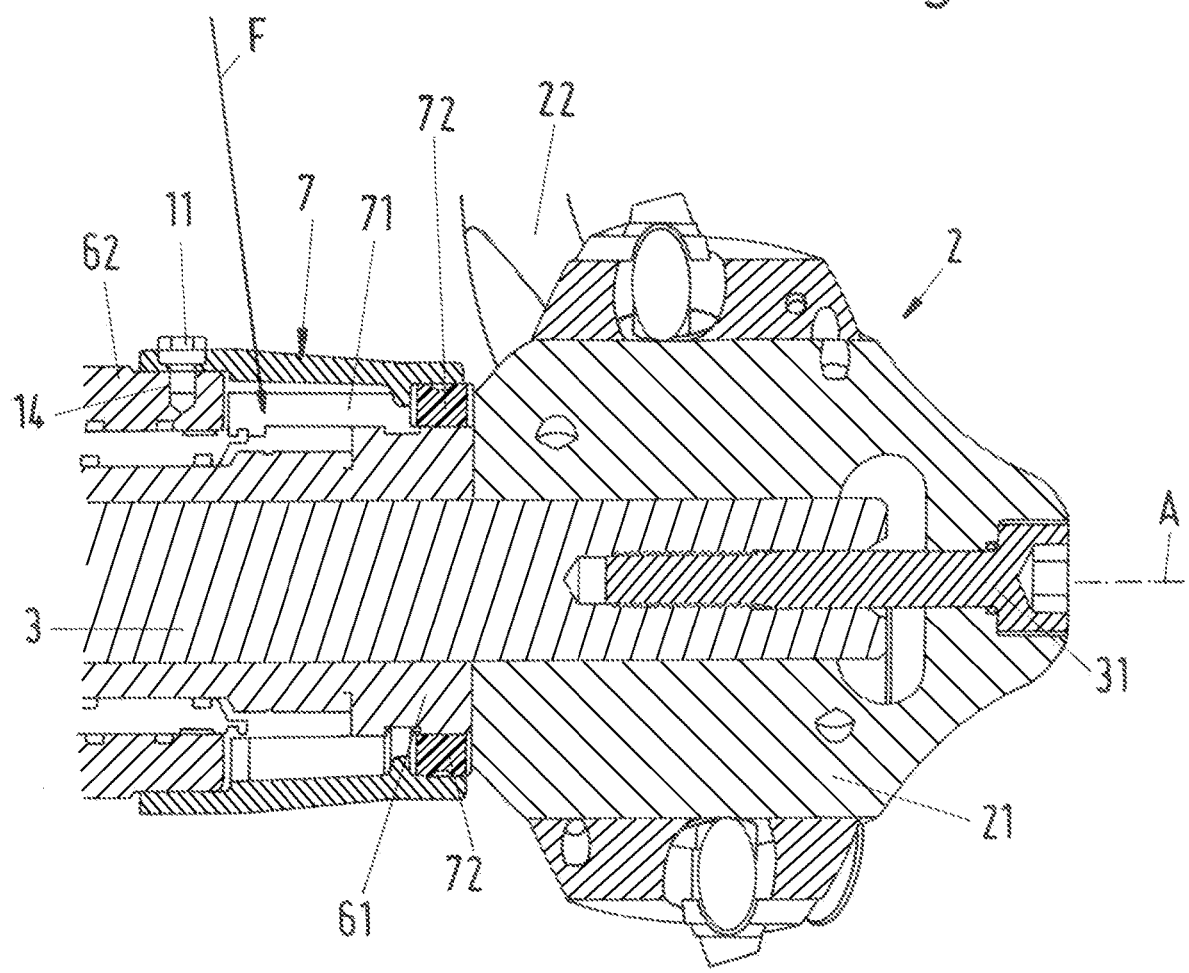
FIG. 2 is a more detailed cross-sectional view of the impeller region of the embodiment.
Figure 3:
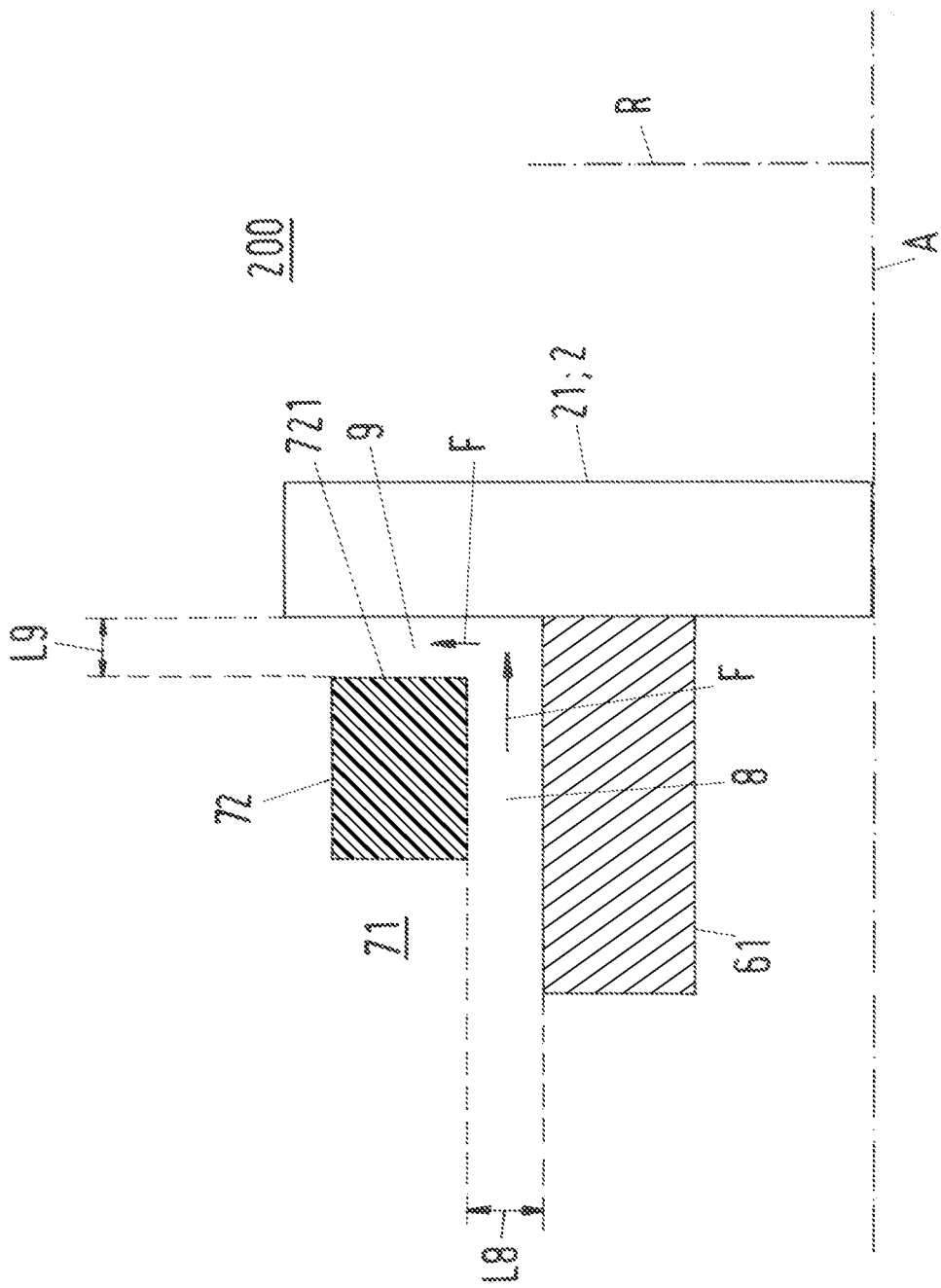
FIG. 3 is a schematic representation of the leakage gaps.

The hub 21 of the impeller 2 is connected in a torque-proof manner to an end of a shaft 3, for example by a central fixing screw 31 (FIG. 2). The other end of the shaft 3 is operatively connected to a drive unit (drive) 4 for rotating the shaft 3 and the impeller 2 about an axial direction A. Thus, the axis of the shaft 3 defines the axial direction A. A direction perpendicular to the axial direction A is referred to as a radial direction R (FIG. 3). The drive unit 4 comprises a motor 41, for example an electric motor 41, and a coupling 42 for operatively connecting the motor 41 with the shaft 3.

The coupling 42 may comprise a belt drive for connecting the motor 41 to the drive shaft 3. Of course, the agitator 1 may also be designed with any other coupling 42 between the motor 41 and the drive shaft 3, for example with a gear box or any other suited transmission device.

The embodiment of the agitator 1 shown in FIG. 1 is designed as a side-mounted agitator. The agitator 1 is designed for being mounted horizontally to the wall 100 of the vessel 200, which may be designed as a tank, a tower, a container or any other receptacle. The shaft 3 is extending horizontally in the usual orientation of use of the agitator 1. Although this is one preferred embodiment for the agitator 1, the invention is not restricted to side-mounted or horizontal agitators 1 or rotary machines. The agitator 1 may also be designed for example as a top-mounted or vertical agitator, i.e. with the shaft extending vertically in the usual orientation of use. Furthermore, it is also possible that the agitator 1 is designed for an oblique mounting to the wall of a vessel, i.e. the axial direction A or the shaft 3, respectively, of the mounted agitator includes an angle with the horizontal direction that is different from zero degree and different from 90 degree.

The side-mounted agitator 1 has a mounting flange 5 for fastening the agitator 1 to the wall 100 of the vessel 200. The mounting flange 5 surrounds the shaft 3 concentrically and comprises several bores (not shown) for receiving screws or bolts for fastening the agitator 1 to the wall 100. When the agitator 1 is mounted to the wall 100, the impeller 2 and the part of the shaft 3 between the mounting flange 5 and the impeller 2 are located within the vessel 200 containing the process fluid to be agitated or mixed by the impeller 2. For sealing the rotating shaft 3 passing through the wall 100 of the vessel 200, the agitator 1 further comprises a sealing unit (seal) 6 having a seal housing 62 as well as a sealing element 61 for sealing the shaft 3 during rotation of the shaft 3. The sealing element 61 may be designed for example as a stuffing box or as a gland packing or as a single mechanical seal or as a double mechanical seal or as any other sealing element 61 for the sealing of a rotating shaft 3. Further details of the agitator 1 such as bearings are well known to the skilled person and therefore will not be described in more detail.

Preferably, the sealing element 61 is designed as a single mechanical seal or as a double mechanical seal. Typically, a mechanical seal comprises a stator and a rotor. The rotor is connected in a torque-proof manner with the shaft 3 of the rotary machine 1 and the stator is fixed with respect to the housing of the rotary machine 1 such that the stator is secured against rotation. During rotation of the shaft 3 the rotor is in sliding contact with the stator thus performing the sealing action.

The agitator 1 further comprises a flush casing 7 configured to receive a flushing fluid for flushing the sealing element 61. The flushing fluid is indicated by the arrow with the reference numeral F in FIG. 1 and FIG. 2. For many applications the flushing fluid may be water. Of course, other gaseous or liquid flushing fluids may be used. The flushing fluid shall protect the sealing unit 6 and in particular the sealing element 61 against an intrusion of the process fluid and in particular solid constituents of the process fluid such as fibers of fibrous materials. In particular, if solid constituents of the process fluid were to enter the sealing element 61, e.g. the mechanical seal, there is a considerable risk of excessive wear or even of damages. Therefore the flushing fluid is provided, which is flowing from the flush casing 7 into the vessel 200 and thus preventing the intrusion of the process fluid into the sealing element 61 or the sealing unit 6, respectively. Furthermore, especially in such applications where the process fluid is hot, the flushing fluids serves as a heat carrier which cools the sealing element 61.

FIG. 2 shows a more detailed cross-sectional view of the impeller 2, the sealing element 61 and the flush casing 7.

The flush casing 7 surrounds the shaft 3 adjacent to the impeller 2 and more precisely adjacent to the hub 21 of the impeller 2. The flush casing 7 is a stationary part and is configured to delimit an annular flush chamber 71 extending about the sealing element 61. The flush chamber 71 is supplied with the flushing fluid as indicated by the arrow F.

The flush casing 7 further comprises a bushing 72 which functions as a throttle for throttling the flow of the flushing fluid from the flush chamber 71 to the vessel 200. With respect to the axial direction A, the bushing 72 is arranged at that end of the flush casing 7 which is adjacent to the hub 21 of the impeller 2. Thus, the bushing 72 has an annular front side 721 (FIG. 4) which faces the hub 21 of the impeller 2.

The bushing 72 delimits two leakage gaps 8, 9 (FIG. 3), through which the flushing fluid may flow or leak from the flush chamber 71 into the vessel 200. For a better understanding FIG. 3 shows a schematic and enlarged representation of the two leakage gaps 8 and 9. A radial leakage gap 8 is located between the seal element 61 and the bushing 72 and an axial leakage gap 9 is arranged between the hub 21 of the impeller 2 and the bushing 72. Thus, the bushing 72 delimits both the radial leakage gap 8 and the axial leakage gap 9. The radial leakage gap 8 has a width L8 as measured in the radial direction R and the axial leakage gap 9 has a width L9 as measured in the axial direction A.

During operation of the agitator 1 the flush chamber 71 is supplied with the flushing fluid, e.g. water. The flushing fluid passes from the flush chamber 71 through the radial leakage gap 8, then through the axial leakage gap 9 and is then discharged to the vessel 200.

The leakage gaps 8, 9 are quite small, i.e. they have a small width L8 and L9 respectively. As an example, the width L8 of the radial leakage gap may be for example less than 0.5 mm, e.g. approximately 0.3 mm. The widths L8 and L9 of the leakage gaps 8 and 9 determine the velocity, with which the flushing fluid flows through the leakage gaps 8, 9 and therewith both the quality or the reliability of the flushing and the consumption of the flushing fluid.

According to the invention the width L9 of the axial leakage gap 9 in the axial direction A is adjustable. For adjusting the width L9 of the axial leakage gap 9 it is preferred that the flush casing 7 is configured to be movable in the axial direction A. The bushing 72 is fixedly connected with the flush casing 7. Thus, a movement of the flush casing 7 in the axial direction A changes the width L9 of the axial leakage gap 9.

Preferably, the flush casing 7 is configured to be movable in the axial direction A between a first end position and a second end position. When the flush casing 7 is in an operating position, which is located between the two end positions regarding the axial direction A, the bushing 72 abuts against the hub 21 of the impeller 2, so that the nominal width L9 of the axial leakage gap 9 equals zero. Of course, it is not required that the width L9 of the axial leakage gap 9 is nominally zero during operation. The flush casing 7 may also be moved to a position where the width L9 is different from zero. When the flush casing 7 is in one of the end positions, for example the second end position, the width L9 of the axial leakage gap 9 has a maximum value. The maximum value is not a critical feature of the invention. It may be for example at most 5 mm or at most 1 mm or at most 0.5 mm. The maximum value may also be larger than 5 mm.

For adjusting the position of the flush casing 71 and therewith the width L9 of the axial leakage gap 9 it is preferred that the flush casing 7 comprises a plurality of slot holes 10 (FIG. 5) with each slot hole 10 extending in the axial direction. For each slot hole 10 a fixing element 11 is provided, which is configured for engaging with the respective slot hole 10.

For a better understanding FIG. 5 shows a plan view onto the flush casing 7 with one of the slot holes 10 and a fixing element 11 engaging with the slot hole 10. The fixing element 11 may be for example a screw. When the fixing element 11 is untightened the flush casing 7 may be moved back and forth with respect to the axial direction A between the first end position, in which the fixing element 11 abuts against a first end 12 of the slot hole 10 and the second end position, in which the fixing element11 abuts against a second end 13 of the slot hole 10. When the fixing element 11 is tightened, the flush casing 7 is fixed, i.e. the flush casing is no longer movable. Thus, the flush casing 7 may be fixed in any position with respect to the axial direction between the first end position and the second end position. FIG. 5 shows the flush casing 7 in the operating position that is located between the first end position and the second end position.

The flush casing 7 comprises at least two slot holes 10 and two fixing elements 11, wherein the slot holes 10 are distributed along the circumference of the flush casing 7. In preferred embodiments the flush casing 7 is provided with three slot holes 10 or with four slot holes 10 and each slot hole 10 is provided with a fixing element 11.

Preferably, the flush casing 7 is mounted to the seal housing 62 (FIG. 2) of the sealing unit 6, i.e. each fixing element 11 passing through one of the slot holes 10 engages with a respective threaded hole 14 in the seal housing 62. In other embodiments the flush casing 7 may be mounted to other stationary, i.e. non-rotating, parts of the agitator.

For installing the agitator 1, it is preferred to move the flush casing 7 to that end position, where the width L9 of the axial leakage gap has the maximum value, for example the second end position. The agitator 1 is mounted to the wall 100 of the vessel 200 and fixed. After that, all fixing elements 11 are untightened and the flush casing 7 is moved in the axial direction A until the desired width L9 of the axial leakage gap 9 is realized. For example, the flush casing is moved to the operating position, in which the bushing 72 abuts against the hub 21 of the impeller. Then the flush casing 7 is fixed by tightening all fixing elements 11.

It is a great advantage that the width L9 of the axial leakage gap 9 is adjustable after the agitator has been installed at the location where it operates. It is no longer necessary to fix the width L9 of the axial leakage gap already at the manufacturing of the agitator. Therefore the flushing of the seal element 61 may be optimized and the velocity of the flushing fluid in particular in the axial leakage gap 9 is controllable.

As a further preferred measure the annular front side 721 of the bushing 72, i.e. the side which faces the hub 21 of the impeller 2, is provided with at least one radially extending groove 722 (see FIG. 4) extending from the radially inner end of the annular front side 721 in radial direction to the radially outer end of the front side 721.

Figure 4:
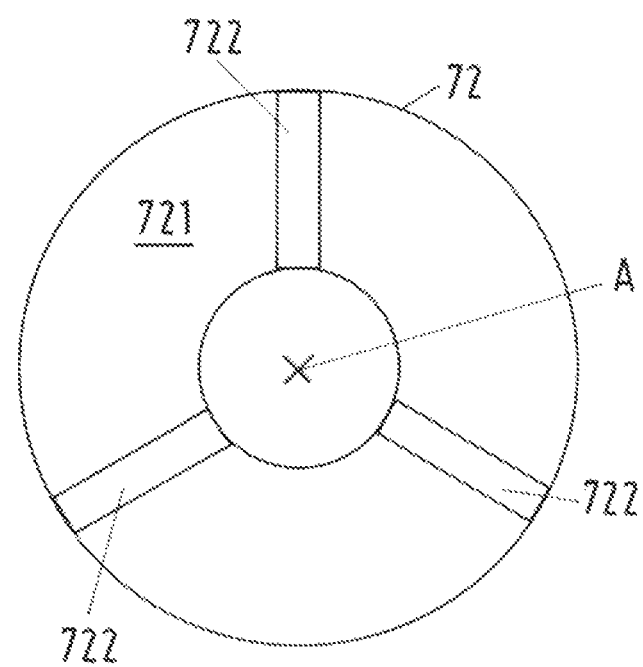
FIG. 4 is a plan view onto the front side of the bushing of the embodiment.

FIG. 4 shows a plan view onto the front side 721 of the bushing 72. As can be seen, in this embodiment three radially extending grooves 722 are provided in the front side 721. The radially extending grooves 722 are preferably uniformly distributed, i.e. the angle between adjacent grooves 722 is the same for all adjacent grooves 722. Preferably there are at least two radially extending grooves 722. By means of the radially extending grooves 722 the flushing fluid may always leak between the front side 721 of the bushing 72 independently from the width L9 of the axial leakage gap.

A further advantage of the adjustable width L9 of the axial leakage gap 9 is that the width L9 may be re-adjusted for example during service or maintenance work after some operation time of the agitator 1.

It is preferred that at least the front side 721 of the bushing 72 is made of a plastic, in particular a wear-resistant plastic such as polytetrafluoroethylene (PTFE). Of course it is also possible that the entire bushing 72 is made of a plastic, e.g. made of PTFE.

What is claimed:
1. A rotary machine for acting on a process fluid, comprising:
   an impeller configured to act on the process fluid;
   a shaft, on which the impeller is mounted;
   a drive operatively connected to the shaft and configured to rotate the shaft and the impeller about an axial direction;
   a seal having a sealing element sealing the shaft during rotation of the shaft; and
   a flush casing configured to receive a flushing fluid for flushing the sealing element, the flush casing delimiting an annular flush chamber extending about the sealing element, and the flush casing comprising a bushing surrounding the sealing element and delimiting a radial leakage gap arranged between the sealing element and the bushing, an axial leakage gap being disposed between and delimited by directly opposing surfaces of the impeller and the bushing, and the flush casing configured to be movable in the axial direction so as to adjust the width of the axial leakage gap in the axial direction.

2. The rotary machine in accordance with claim 1, wherein the flush casing is configured to be movable in the axial direction between a first end position and a second end position.

3. The rotary machine in accordance with claim 2, wherein the width of the axial leakage gap is zero when the flush casing is in an operating position located between the first end position and the second end position, so that the bushing abuts against the impeller.

4. The rotary machine in accordance with claim 2, wherein the width of the axial leakage gap is at a maximum value when the flush casing is in one of the first and the second end position.

5. The rotary machine in accordance with claim 4, wherein the maximum value is at most 5 mm.

6. The rotary machine in accordance with claim 4, wherein the maximum value is at most 1 mm.

7. The rotary machine in accordance with claim 4, wherein the maximum value is at most 0.5 mm.

8. The rotary machine in accordance with claim 1, wherein the flush casing comprises a plurality of slot holes with each slot hole of the plurality of slot holes extending in the axial direction, and for each slot hole a fixing element is provided to engage a respective slot hole and to fix the flush casing with respect to the axial direction.

9. The rotary machine in accordance with claim 1, wherein the bushing comprises an annular front side facing the impeller, and at least one radially extending groove is disposed in the front side of the bushing.

10. The rotary machine in accordance with claim 9, wherein the front side of the bushing is plastic.

11. The rotary machine in accordance with claim 1, wherein the bushing is plastic.

12. The rotary machine in claim 1, further comprising a mounting flange configured to fasten the rotary machine to a wall of a vessel.

13. The rotary machine in accordance with claim 1, wherein the impeller is an agitator configured to mix and agitate the process fluid.

14. The rotary machine in accordance with claim 13, wherein the rotary machine is configured to be horizontally mounted to a wall of a vessel.

15. The rotary machine in accordance with claim 1, wherein the radial leakage gap is configured to enable the flushing fluid to pass therethrough during operation of the rotary machine.

16. The rotary machine in accordance with claim 1, wherein the axial leakage gap is configured to enable the flushing fluid to pass therethrough during operation of the rotary machine.

17. A rotary machine for acting on a process fluid, comprising:
an impeller configured to act on the process fluid;
a shaft, on which the impeller is mounted;
a drive operatively connected to the shaft and configured to rotate the shaft and the impeller about an axial direction;
a seal having a sealing element sealing the shaft during rotation of the shaft; and
a flush casing configured to receive a flushing fluid for flushing the sealing element, the flush casing delimiting an annular flush chamber extending about the sealing element, and the flush casing comprising a bushing surrounding the sealing element and delimiting a radial leakage gap arranged between the sealing element and the bushing, the bushing arranged and configured to delimit an axial leakage gap between the impeller and the bushing, and the width of the axial leakage gap in the axial direction being adjustable, the flush casing configured to be movable in the axial direction between a first end position and a second end position, and the width of the axial leakage gap is zero when the flush casing is in an operating position located between the first end position and the second end position, so that the bushing abuts against the impeller.

* * * * *